US005263651A

United States Patent [19]

Nadarajah

[11] Patent Number: 5,263,651

[45] Date of Patent: Nov. 23, 1993

[54] SAFETY DEVICE FOR CHIP CONDITIONING DEVICE

[75] Inventor: Ravindran Nadarajah, Portland, Oreg.

[73] Assignee: Beloit Technologies, Inc., Wilmington, Del.

[21] Appl. No.: 861,728

[22] Filed: Apr. 1, 1992

[51] Int. Cl.[5] ........................ B02C 25/00; B07C 5/344

[52] U.S. Cl. ........................................ 241/28; 241/34; 241/81; 241/82; 162/55; 209/567; 209/571; 209/655; 209/657

[58] Field of Search ........................ 241/28, 81, 82, 34, 241/135; 162/28, 55; 209/567, 571, 700, 655, 657

[56] References Cited

U.S. PATENT DOCUMENTS

| | | | |
|---|---|---|---|
| 1,348,310 | 8/1920 | North | 209/655 X |
| 2,444,751 | 7/1948 | Scott | 209/567 |
| 4,171,262 | 10/1979 | Lattmann et al. | 209/570 X |
| 4,350,307 | 9/1982 | Olson | 241/81 |
| 4,480,753 | 11/1984 | Thomas et al. | 209/570 X |
| 4,753,353 | 6/1988 | Kramer | 209/570 |
| 4,763,792 | 8/1988 | Kind | 209/570 |
| 4,815,667 | 3/1989 | Keller | 241/81 X |
| 4,953,795 | 9/1990 | Bielagus | 241/293 X |
| 5,090,574 | 2/1992 | Hamby | 209/657 X |
| 5,133,507 | 7/1992 | Sepling et al. | 241/28 X |

FOREIGN PATENT DOCUMENTS

| | | | |
|---|---|---|---|
| 2944192 | 5/1981 | Fed. Rep. of Germany | 209/567 |
| 34457 | 7/1989 | Japan | 209/571 |
| 8400874 | 10/1985 | Netherlands | 241/28 |
| 312684 | 1/1930 | United Kingdom | 209/567 |

*Primary Examiner*—Mark Rosenbaum
*Assistant Examiner*—Frances Chin
*Attorney, Agent, or Firm*—Dirk J. Veneman; Raymond W. Campbell

[57] ABSTRACT

An apparatus for processing wood chips for use in the preparation of pulp in a papermaking operation including a conduit for accommodating a flow stream of wood chips, a rotary valve in the conduit, shunt branch conduits with a first shunt leading to a chip dumping bin and a second shunt leading to a chip processing device; dampers in the branches with the damper for the first shunt branch being in normally closed position and a damper in the other shunt branch being in a normally open position; and a metal detection device upstream of the branches operative to move the first damper to open position and the second damper to closed position for a predetermined time and to stop the rotary valve and to reactivate the dampers and rotary valve after a predetermined time.

11 Claims, 1 Drawing Sheet

10
11
12
13
30
CONTROL
29
14
27
14
28
24
19
18
21

10
11
12
29
29
25
26
14
15
27
16
17
18
19
20
21
22
23

SAFETY DEVICE FOR CHIP CONDITIONING DEVICE

BACKGROUND OF THE INVENTION

The present invention relates to an apparatus and method for treating wood chips and particularly to a control apparatus which prevent damage to downstream treating and destructuring apparatus due to the presence of tramp metal In connection with the papermaking process, logs are debarked and chipped and the wood chips are treated to release individual cellulose fibers for the preparation of paper formation stock.

One device for treating the chips is a chip slicer which includes a rotor operating within a drum wherein oversized chips are forced against knives and sliced to an acceptable thickness. Another form of chip processing device is disclosed in U.S. Pat. No. 4,953,795 wherein chips are passed between a pair of closely operating rolls which supply compressive forces to the chips to cause the chips to crack in the thickness dimension as compressive force is applied to the chips.

Common to chip processing devices is a conduit for handling the chips leading to the chip processing device and a flow stream of chips flow through the conduit controlling a uniform supply of wood chips. In one form of such conduit, chips are carried pneumatically past a rotary valve which regulates the flow. Common to all chip processing devices is the risk that tramp metal will become embodied in the chip flow stream and such tramp metal has a devastating effect on the chip processing apparatus, breaking knives or damaging operating surfaces to the extent that the machine must immediately be shut down and the resultant damage repaired. Yet, for satisfactory commercial processing of chips, it is desirable, if not essential, that the machine continue operating at a relatively uniform speed of operation to be able to accommodate the supply of chips which is continually fed to the chip processing apparatus.

FEATURES OF THE INVENTION

It is an object of the present invention to provide an apparatus which is wholly protective of wood chip processing mechanism by detecting the presence of tramp metal and preventing such tramp metal from passing through the chip processing apparatus.

A further object of the invention is to provide an apparatus for handling a continuous wood chip flow stream and detecting tramp metal but automatically protecting the wood chip treating apparatus without substantially interrupting the continuous operation of the machinery.

A still further object of the invention is to provide an apparatus capable of handling a continual flow of wood chips to a chip processing machine and automatically bypassing or shunting tramp metal without interrupting the continuous machine operation and automatically restoring normal wood chip stream flow to the mechanism after a limited predetermined time.

In accordance with the features of the invention, wood chips are delivered in a continual flow stream such as in a pneumatic conduit past a rotary flow control valve. The conduit leads the chip flow stream to a shunt zone where automatic dampering apparatus is provided which in the presence of tramp metal, will automatically and instantaneously deflect the flow stream to a dumping bin. After a short predetermined time, the dampering apparatus will restore the flow of wood chips to the chip treating apparatus. Such operation will continue automatically without requiring attention from the operator and resulting in protection of the continual operating chip processing mechanism.

Other objects, advantages and features will become more apparent with the teaching of the principles of the invention in connection with the disclosure of the preferred embodiments thereof in the specification, claims, and drawings in which:

DESCRIPTION OF THE PREFERRED EMBODIMENTS

Figures 1, 2:
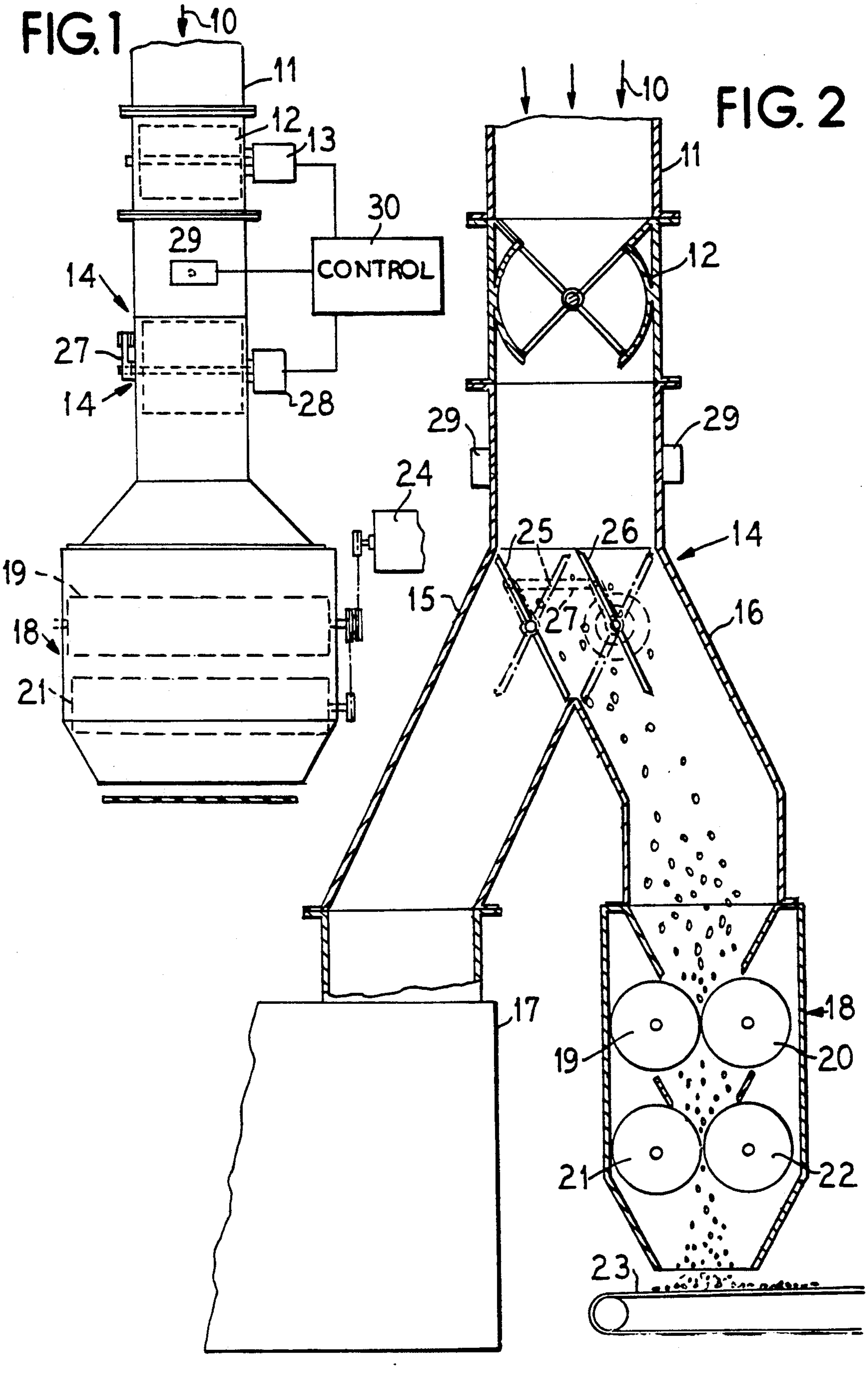
FIG. 1 is an elevational view shown in somewhat schematic form of a conduit accommodating a chip flow stream to a chip processing apparatus constructed and operating in accordance with the principles of the present invention.
FIG. 2 is a vertical sectional view shown somewhat enlarged relative to the showing of FIG. 1 and illustrating the internal construction of the apparatus of FIG. 1.

As shown in FIGS. 1 and 2, a flow stream of wood chips indicated by the arrowed line 10 is carried by a conduit 11 for handling the passage of the wood chip flow stream and for conducting it to wood chip processing equipment shown generally at 18.

The conduit 11 carries the flow stream past a rotary air lock and feeder 12, the rotation of which is driven and controlled by a motor 13.

The flow stream of wood chips flows through the conduit 11 downwardly to where it enters an area of the conduit which may be termed a shunt zone 14. At the shunt zone, the flow of wood chips normally is conducted downwardly to the chip processing equipment 18.

At the shunt zone forming an angle with the conduit 11, is a first branch conduit 15 for shunting undesirable chips from the main conduit 11 and this leads to a dumping bin 17. At the shunt zone, is a second accepts branch 16 through which the chips flow in normal operation down to the processing equipment. The processing equipment may be of various constructions such as having chipping knives or other equipment which cannot tolerate tramp metal which will be fully appreciated by those versed in the papermaking art. As illustrated, the chips pass between a series of rolls which destructure the chips and apply compressive forces thereto. The first pair of rolls 19 and 20 has a nip therebetween and after passing through the nip, the chips enter a nip between a second pair of rolls 21 and 22. After the chips are processed, they drop down onto a conveyor belt 23 to pass onto other processing equipment such as digesters.

The flow of chips at the shunt zone is controlled by first and second dampers 25 and 26.

The first damper 25 is shown in the solid line position as a normally closed position wherein the first branch conduit 15 is shut off so that chips do not flow into it. The damper 25 can be operated to move to an activated open position as shown by its dotted line position whereupon the chips will be shunted through the branch conduit 15 down into the dumping bin 17.

The flow of chips into the second accepts branch conduit 16 is controlled by the damper 26 which is shown in its normal position in solid line. The damper 26 is, however, activated to a closed dotted line position at such time when tramp metal is present and the chips are to be shunted to the dumping bin 17.

The dampers 25 and 26 are activated simultaneously and for this purpose, are provided with crank arms and an interconnecting link 27 so that they are moved simultaneously. They are operated by a motor 28 which, at the time tramp metal is present, moves them from their normal position to their activated position.

Upstream from the shunt zone 14 is a metal detection device 29. This may take various forms such as electrical coil equipment which senses change in flux path with the presence of metal or they constitute other equipment capable of sensing instantaneously the content of undesirable metal chips or tramp metal in the chip flow stream. The metal detector 29 is connected to a control 30. The control 30 is capable of simultaneously operating the damper operator 28 and the air lock feeder motor 13.

When the sensing device 29 senses the presence of tramp metal, a signal is fed to the control 30 and it will instantaneously move both the first and second dampers from their normal position to their activated position. That is, the first damper leading to the dumping bin will move to the dotted line position, and the second damper 26 will move to the dotted line position to shut off the flow of chips to the processing device 18. This insures that the tramp metal which has been detected at the area 14 will be shunted to the bin 17 and not permitted to pass into the chip processing equipment where it can damage the rolls or destroy knives or whatever equipment is used in the chip processing operation.

The air lock feeder also is immediately shut off so that a further supply of chips is temporarily terminated until the tramp metal clears and is discharged into the bin 17.

The control 30 is provided with a pause device so that after a few seconds pause, the two dampers 25 and 26 will instantaneously be moved to their normal position thereby again shunting the flow of chips down to the processor 18. Simultaneously, the rotary air lock valve 12 will again operate to continue the flow of chips. The time of pause is so short that there will not be a jam up of the flow of chips. In some instances, it can be arranged so that the air lock feeder will return to normal operation just a fraction of a second prior to the dampers 25 and 26 returning to their normal solid line position. The pause time that the dampers are turned to their dotted line position when the presence of iron or other metal is detected, can be set so that it varies from a fraction of a second to a few seconds depending upon the type of chips being handled, the speed of operation of the processor 18 and the flow condition of the chips. This pause variance control is set in the control 30 so that it can be manually adjusted or automatically adjusted dependent upon the flow of chips indicated by the arrowed line 10.

In operation, the chip processor 18 is operated continuously being driven by a motor 24. As will be observed if tramp metal is permitted to flow between the processing rolls 19 and 20 and 21 and 22, the rolls can be damaged and the drive motor 24 can also be damaged. However, with the bypass damper arrangement, the chip processing equipment can continue at a normal speed of operation with the presence of any tramp metal being shunted away from the processing equipment. With a normal flow of chips, they are continued to be processed and when tramp metal is sensed by the sensor 29, the dampers immediately flip over the dotted line position to shunt the flow of chips to the dump bin 17. The rotary air feeder valve 12 is stopped briefly and after a predetermined pause time such as a few seconds, the dampers return to their solid line position and the air feeder valve 12 again operates. This operation will continue automatically throughout the operation of the equipment without necessitating extension of the operator and without risking the damage to the chip processing equipment.

Thus, it will be seen there has been provided a mechanism and method for processing wood chips which meets the objectives and advantages above set forth and provides a mechanism which can be adapted to present chip processing apparatus or equally well, can be utilized in new installations.

I claim as my invention:

1. A method for processing wood chips for use in the preparation of pulp for papermaking in accordance with the steps:

passing wood chips in a chip flow stream through a conduit to processing equipment;

supplying a flow of wood chips to the conduit;

providing a shunt zone in said conduit having a first branch for shunting undesirable chips from the conduit and a second accepts branch leading to the chip processing device;

controlling chip flow in said shunt zone by providing a first damper in the first branch movable between a normally closed position and an activated open position and providing a second damper in said second branch movable between a normally open position and an activated closed position;

detecting the presence of tramp metal upstream of the shunt zone;

interrupting the supply of wood chips in response to presence of metal in the chip flow stream;

and operating said dampers simultaneously moving the dampers from normal position to activated position in response to the presence of metal in the chip flow stream.

2. A method for processing wood chips for use in the preparation of pulp for papermaking in accordance with the steps of claim 1:

including automatically moving the dampers to their normal position after a predetermined time.

3. A mechanism for processing wood chips for use in the preparation of pulp for papermaking comprising in combination:

a closed pneumatic conduit for the passage of a flow stream of wood chips to processing equipment;

a rotary valve in the conduit for controlling the flow of wood chips;

a shunt zone downstream from the rotary valve having a first branch extending at an angle to the conduit for shunting undesirable chips from the conduit and a second accepts branch extending at an angle to the conduit leading to a chip processing device;

a first damper at the head end of the first branch movable between a normally closed position and an activated open position;

a second damper in said second branch movable between a normally open position and an activated closed position;

mechanical means interconnecting said dampers;

a metal detection device located between said rotary valve and the dampers;

an operation mechanism connected to said metal detection device and operative responsive to the presence of tramp metal by the metal detection device to automatically move said first and second damper means to their activated position and to operate the rotary valve to terminate the flow of wood chips;

and a variable timer operative after a preset time to reoperate the rotary valve and to simultaneously move said dampers to their normal position.

4. A mechanism for processing wood chips for use in the preparation of pulp for papermaking comprising in combination:

a conduit for the passage of a flow stream of wood chips to chip processing equipment;

means for supplying a flow of wood chips to said conduit;

a shunt zone in said conduit having a first branch conduit for shunting undesirable chips from the conduit and a second accepts branch leading to a chip processing device;

a first damper means in said first branch movable between a normally closed position and an activated open position;

a second damper means in said second branch movable between a normally open position and an activated closed position;

a tramp metal detection device positioned upstream of said shunt zone;

feeder means for controlling the flow of wood chips to said shunt zone, said feeder means being upstream of said tramp metal detection device;

drive and control means connected to said feeder means and to said detection device to operate said feeder means to interrupt the flow of wood chips in response to the presence of metal in the chip flow stream;

and a damper means operator connected to said detection device and to said damper means simultaneously moving said dampers from normal position to activated position in response to the presence of metal in the chip flow stream.

5. A mechanism for processing wood chips for use in the preparation of pulp for papermaking constructed in accordance with claim 4:

including a dump chamber connected to receive wood chips from said first branch when the first damper means is in activated position.

6. A mechanism for processing wood chips for use in the preparation of pulp for papermaking constructed in accordance with claim 4:

wherein said second branch leads to a chip slicer.

7. A mechanism for processing wood chips for use in the preparation of pulp for papermaking constructed in accordance with claim 4:

wherein said second branch leads to a chip conditioning device.

8. A mechanism for processing wood chips for use in the preparation of pulp for papermaking constructed in accordance with claim 4:

wherein said metal detection device is in the form of an electrical circuit responsive to the change in induction field with the passage of tramp metal in the conduit.

9. A mechanism for processing wood chips for use in the preparation of pulp for papermaking constructed in accordance with claim 1:

including an automatic return for moving said first and second dampers to normal position.

10. A mechanism for processing wood chips for use in the preparation of pulp for papermaking constructed in accordance with claim 9:

wherein said dampers are moved to normal position after a predetermined pause time.

11. A mechanism for processing wood chips for use in the preparation of pulp for papermaking constructed in accordance with claim 10:

including means for variably controlling the length of said pause time.

* * * * *